United States Patent Office 2,920,089
Patented Jan. 5, 1960

2,920,089

ORGANO-METALLIC TITANIUM COMPOUNDS AND METHOD OF MAKING THE SAME

Carlos M. Samour, Brighton, Mass., assignor to The Kendall Company, Boston, Mass., a corporation of Massachusetts No Drawing. Application July 14, 1955
Serial No. 522,161

28 Claims. (Cl. 260—429.5)

This invention relates to new organo-metallic titanium compounds and pertains more specifically to monomeric solid organo-metallic titanium compounds having a cyclic structure in which a single titanium atom forms a part of each of two hetrocyclic rings, and low addition polymers thereof.

Although esters of orthotitanic acid with alcohols, either monohydric or polyhydric, have been previously known, these materials are relatively unstable, particularly those made from lower molecular weight alcohols, tending to hydrolyze with polymerization to form condensation polymers in the presence of even minute quantities of water. Many of these esters in their monomeric form are so sensitive to water that they cannot be left exposed to the atmosphere for any appreciable length of time without undergoing decomposition and/or condensation polymerization to a substantial extent, resulting in materials characterized by a chain of alternating oxygen and titanium atoms frequently relatively insoluble. Such condensation polymers possess an elemental analysis different from that of their corresponding monomers. In the case of mixed esters prepared from a mixture of monohydric alcohol and a polyhydric alcohol, it has been reported that a second hydroxyl group of the polyhdric alcohol is capable of chelation with the titanium atom, which possesses a coordination number of six. However, the bond between the second hydroxyl group and the titanium atom is not a primary valence bond in such materials, but a secondary bond of much lower strength.

The compounds of the present invention which may be considered to be monomeric cyclic esters and monomeric cyclic mixed anhydrides are solid materials which are easily handled and which, because of their solid nature, may be obtained in highly purified form. Moreover, these new materials are more stable to water, particularly to water in the form of atmospheric moisture, than are the esters previously known. By the term "monomeric" is meant a compound containing only a single titanium atom in each molecule, as distinguished from polymers containing two or more titanium atoms bonded into a single molecule with primary valence bonds. By the term "low addition polymers" is meant polymers having the same elemental composition as the corresponding monomeric materials in which the average degree of polymerization (i.e., the average total number of titanium atoms per molecule) is no greater than five. These low addition polymers are equivalent to the monomeric materials for many purposes, since the two may be readily interconverted.

All of the compounds of the present invention contain on the average from one to five titanium atoms in the molecule and have at least two heterocyclic rings with each titanium atom forming a part of two adjacent rings, each ring consisting, in addition to titanium, of

groups in which each oxygen atom is bonded directly to titanium and R is a group containing from two to three aliphatic carbon atoms in the chain connecting the oxygen atoms, the number of —O—R—O— groups in the molecule being twice the number of titanium atoms.

In the monomeric compounds of the present invention, a single titanium atom forms a part of each of two heterocyclic rings, each ring containing from five to six atoms, of which the two adjacent the titanium atom are oxygen and the remaining atoms of the ring are aliphatic carbon atoms. Although all four of the primary valences of the titanium atom are satisfied in such compounds, there remain two secondary valences (since the coordination number of titanium is six) which enable the compounds to chelate internally if there are any unreacted chelating (donor) groups such as hydroxyl, nitrile, ester, or amino groups present in the molecule, e.g., as substituents on the ring carbon atoms, and which are geometrically situated so that the chelating groups can interact with the titanium. These secondary valences also make it possible for two or more molecules to associate with each other when they contain such unreacted donor groups or to associate with other materials containing such groups.

The cyclic esters of the present invention may be prepared by an ester interchange reaction in which one mole of a tetraalkyl titanate is reacted with two moles of a polyhydroxy alcohol under anhydrous conditions. In some cases it may be advantageous to carry out the reaction in the presence of a volatile solvent or diluent; a solvent inert to the reactants may be used, e.g., benzene, xylene, hexane or other hydrocarbon, halogenated hydrocarbons such as chloroform or ethylene dichloride; or a monohydric alcohol more volatile than the polyhydric alcohol may be employed, e.g., the alcohol produced as a by-product in the reaction. Similarly, the cyclic mixed anhydrides of the present invention may be prepared by reacting one mole of a tetraalkyl titanate with two moles of a dibasic carboxylic acid under anhydrous conditions. The reaction proceeds in the same manner as in the case of the polyhydroxy alcohols, so that for the purpose of this reaction the carboxylic acids may be regarded simply as a species of aliphatic polyhydroxy compound, the hydroxyl group in the carboxylic acid radical being equivalent to the alcoholic hydroxyl group. In each case, the reaction proceeds with the liberation of four moles of an alkyl alcohol, the identity of the alcohol liberated depending upon the tetraalkyl titanate employed as a starting material. The alcohol thus formed as a by-product may be removed simply by distilling it off either at atmospheric pressure or at reduced pressure, thus causing the reaction to go essentially to completion. In a few cases the solubility of the desired product may be such that it precipitates from the reaction mixture, in which case filtration may suffice to remove the alcohol without the necessity for distillation; for example, in the reaction of ethylene glycol with tetraisopropyl titanate. However, an insoluble product at this point is not necessarily the desired product of this invention. For example, one optically active polyhydroxy alcohol, D-(—)-butanediol-2,3, when mixed with tetra-tert-butyl titanate in a 2:1 mole ratio even in the presence of excess tert, butyl alcohol as solvent, reacts to form an insoluble product, but the product is not a monomer or polymer of the present invention, and heating the solid product even in vacuo does not suffice to convert it into the product of the invention. Under such circumstances, when an insoluble material other than the desired product precipitates, it is usually desirable to add an inert diluent which is a good solvent for the undesired precipitated product, for example, benzene or chloroform in the case given above, then distill to remove the required four moles of by-product alkanol as well as the inert diluent. Alternatively, in some cases, the undesired precipitate may be first separated by filtration, then dissolved in a good inert solvent and submitted to distilaltion, whereupon the desired product may be obtained. The yield of the desired product usually approaches the theoretical, as indicated by the amount of by-product alcohol evolved. The cyclic esters may also be produced from the tetraalkyl titanates by reaction with two moles of the mono- or polyesters of the polyhydroxy alcohols, preferably esters of the lower fatty acids containing up to four carbon atoms, such as acetic, propionic, or butyric acid, in which case an alkyl ester of the fatty acid will be produced as a by-product, the alkyl group being derived from the tertaalkyl titanate.

The monomeric compounds of the present invention possess the following structure in which A and $A_1$ indicate an aliphatic chain containing from two to three carbon atoms in the chain connecting the oxygen atoms, a single titanium atom replacing two hydroxyl hydrogen atoms in each of two molecules of polyhydroxy compound:

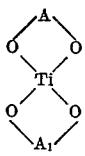

The reaction leading to the production of these new compounds may be represented as follows, where R is ethyl, propyl, butyl, etc.:

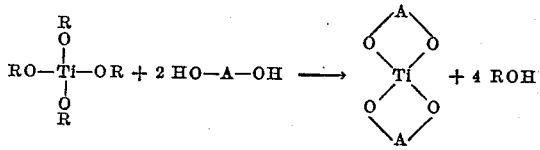

It has been found that the carbon chain indicated as A above must be from two to three carbon atoms long, attempts to produce analogous compounds in which chain A is either longer or shorter failing to produce the desired compound in more than minute quantities.

Among the tetraalkyl titanates which may be employed as starting materials for the compounds of the present invention are tetraethyl titanate, tera-n-propyl titanate, tetraisopropyl titanate, tetra-n-butyl titanate, tetraisobutyl titanate, and tetra-tert-butyl titanate. The four alkyl groups in such tetraalkyl titanates need not be identical. Although analogous alkyl esters higher than the butyl esters may be employed as the starting material, longer chain alkyl esters are in general not so desirable because the higher molecular weight alcohols produced as by-products of the recation, being less volatile, are more difficult to remove, making it more difficult to drive the reaction to completion except in those few cases in which the desired product is insoluble. Similar volatility considerations apply when an alkyl ester of a fatty acid is the by-product to be removed. In that case it is desirable to employ the ester of a lower fatty acid containing up to four carbon atoms such as acetic, propionic, or butyric acid.

The polyhydric alcohols or polyhydroxy compounds which may be employed as the starting material must have two hydroxyl groups separated by an aliphatic carbon chain from two to three carbon atoms long. However, each of the carbon atoms in the chain may have one or both of its hydrogen atoms substituted by a wide variety of groups, including aromatic groups and aliphatic groups containing up to as many as thirty carbon atoms or more, the properties of the resultant cyclic ester depending in part upon the nature of the substituent groups attached to the carbon chain. Among the readily available polyhydric alcohols which may be employed are ethylene glycol; phenylethanediol-1,2; propanediol-1,2; propanediol-1,3; butanediol-1,2; butanediol-1,3; butanediol-2,3; 3-butenediol-1,2; 2-methylpropanediol-1,2; pentanediol-1,2; pentanediol-2,3; pentanediol-2,4; 3-methylbutanediol-1,2; 2-methylbutanediol-2,3; 2-methylpentanediol-1,3; 2-methylpentanediol-2,4; 2,3-dimethylbutanediol-2,3; 1,5-hexadiene-3,4-diol; hexanediol-2,3; 2,2-diethylpropanediol-1,3; 2-propylheptanediol-1,3; 2-ethylhexanediol-1,3; 2-butylbutanediol-1,3; octanediol-4,5; 2-methyl-2-propyl-propanediol-1,3; 2-butyl-2-ethyl-propanediol-1,3; 3,4-diethylhexanediol-3,4; 2,3-diphenylbutanediol-2,3; 2-4-diphenylbutanediol-1,3; 2-amino-2-methyl-propanediol-1,3; 2,2-dimethylpropanediol-1,3; 2-methyl-2-nitropropanediol-1,3; 2-ethyl-2-nitropropanediol-1,3; 3-chloropropanediol-1,2; dihydroxyacetone; hexanetriol-1,2,6; glycerol, glycerol-1-octadecylether, glycerol monoesters such as glycerol monoacetate, glycerol monolaurate, glycerol monostearate, glycerol monopalmitate, glycerol monooleate, glycerol monobenzoate. In addition, as pointed out above, mono- or polyesters of the foregoing polyhydroxy materials with lower fatty acids may also be employed, such as the mono- and diacetates of ethylene glycol, propanediol-1,2, propanediol-1,3, glycerol triacetate, etc.

The mixed anhydrides of the present invention may be prepared as indicated above in an analogous fashion from dibasic carboxylic acids such as oxalic or malonic acid or substituted malonic acids such as ethyl malonic, dimethyl malonic, butyl malonic, chloromalonic, benzyl malonic, and the like.

If desired, mixtures of any two or more of the foregoing polyhydroxy compounds or esters thereof may be employed, including mixtures of polyhydroxy alcohols such as 2-ethylhexanediol-1,3 with dibasic carboxylic acids such as oxalic acid, in which case the two rings present in the product may not be identical. However, it is essential that the ratio of the moles of tetraalkyl titanate to the total moles of polyhydroxy compound in the mixture be 1:2 in order to produce the desired cyclic products. Obviously, in order to obtain a pure compound having two different rings, a mixture of only two polyhydroxy compounds should be employed, and the mole ratio of the three reactants should be 1:1:1.

Although the precise temperature at which the reaction is carried out is not critical, it is normally preferred to carry out the reaction at moderate temperatures, about 20° to 70° C. The alkanol or alkyl ester produced as a by-product may be removed by volatilization, either at atmospheric pressure or at reduced pressure; the reaction is complete when four moles of the alcohol or ester by-product have been distilled off. Although this procedure usually leads directly to a monomeric product, in some cases a low addition polymer may be formed containing up to five titanium atoms on the average, or the product may be a mixture of monomeric compound and such addition polymer. These polymers are addition polymers having the same elemental analysis as the corresponding monomeric compound. It is believed that these polymers are polycyclic compounds in which the titanium atoms are bonded together by means of alkylene ether linkages, not by oxygen alone. These polymers normally are glassy solids and substantially more soluble in most organic solvents than the usually crystalline corresponding monomeric compounds.

The monomeric materials generally may be polymerized to such products simply by heating in an inert solvent such as benzene, xylene, or chloroform in the presence of a chelating agent such as an alkanol or alkylamine, preferably of lower molecular weight containing up to four carbon atoms. The amount of chelating agent is not critical, as little as 0.5 mole or even less per mole of monomeric material being effective. Since the monomer generally is substantially less soluble than the corresponding polymer, any unreacted monomer may readily be separated, following which the solvent and chelating agent may be removed as by distillation. The polymers, in turn, may be depolymerized or converted into the corresponding monomers by dissolving in a lower alkyl alcohol containing up to four carbon atoms such as ethyl, propyl or butyl alcohol, and distilling off the alcohol, preferably at reduced pressure. Any unconverted polymer may be separated by extraction with an inert organic solvent other than an alcohol. The amount of alcohol is not critical, but it is preferred to employ at least two moles of alcohol for each titanium atom in the polymer.

In most cases it is possible to cause preferential formation of polymer in the original reaction of the tetraalkyl titanate by employing in the reaction a non-alcoholic solvent inert to the reactants; e.g., benzene, chloroform, xylene, etc.

Although the compounds of the present invention are more stable toward moisture, as indicated above, than are the previously known alkyl esters of orthotitanic acid, they nevertheless react both with water and with alcohols, either in solution or dispersed in a liquid medium which is a solvent for the reaction product. Accordingly, it will be seen that the compounds of the present invention are conveniently converted to esters, anhydrides, polymers, etc., of the type previously known and therefore provide a convenient source for such materials, the source material being readily purified and conveniently stored and handled or shipped.

In addition, the new compounds, both monomeric and polymeric, of the present invention possess unique advantages in that they are capable of reacting or coordinating with other compounds containing donor groups such as compounds containing hydroxyl, carboxyl, amino or mercapto groups, to form addition products without the liberation of any byproduct. For this reason, the compounds of the present invention are remarkably effective bonding agents or adhesion promoters, providing strong bonds with such compounds containing donor groups without the necessity for disposing of any by-product. The properties of the new compounds may be modified by varying the substituent groups present on the aliphatic carbon chain to produce a series of compounds having varying solubilities and adhesion promoting properties.

The following specific examples will serve to illustrate more clearly the nature of the invention and are not intended as limitations upon its scope.

*Example 1*

A. In a dry one liter standard taper, round-bottom flask was placed 170.4 g. (0.6 mole) of tetraisopropyl titanate and 175.2 g. (1.2 moles) of 2-ethyl-hexanediol-1,3. The reaction was exothermic. The contents were well mixed by swirling, and the flask was then connected to a distillation apparatus and the isopropyl alcohol distilled off under vacuum at 40°–45° C. The contents were then dried in a vacuum desiccator, yielding 203 g. of white solid (theoretical 201.6 g.). The total amount of alcohol removed was 142.6 g. (theoretical 144.0 g.).

B. 33.6 g. of the above product was digested at room temperature with 110 g. of dry n-hexane for 46 hours. The mixture was filtered, the solid washed twice with dry n-hexane and finally dried in a vacuum desiccator. The weight of the white crystalline-looking solid was 21.6 g.; M.P. 263.0°–267.3° C. (corr.). The molecular weight (modified Rast method) was determined to be 356. (Calculated molecular weight for monomer 336.4.) The filtrate and washings were combined and the n-hexane removed, leaving 11.9 g. (35.4% of the mixture) of amber colored glass for which no definite melting point could be determined; the molecular weight of the glass (modified Rast method) was 678 (calculated molecular weight of dimer 673).

C. A sample of the product of Example 1A was recrystallized from dry xylene with large loss of material, and the resulting crystals were dried in a vacuum desiccator. Samples for analysis were dried in a drying pistol at 61° C. and 3 mm. pressure; M.P.=254.5° to 259.0° C. (corr.). When the melting point tube was first immersed in the bath at 220°, the melting point was 261.7° to 263.0° C. (corr.).

*Analysis.*—Calculated for $C_{16}H_{32}O_4Ti$: C=57.12%; H=9.58%; Ti=14.24%. Found: C=57.34%, 57.14%; H=9.54%, 9.68%; Ti=14.52%, 14.36%.

*Example 2*

To 9 g. of the polymeric product of Example 4 was added 50 ml. of dry isopropyl alcohol. The mixture was refluxed for two hours and the alcohol was distilled in vacuo at 60°–30° C. The residue was digested at room temperature with 50 ml. dry benzene, the solid was filtered, washed with n-hexane and dried. Weight of white crystalline solid 3.6 g., M.P.=261°–264° C. (corr.). The solid was mixed with a sample of known monomeric material from Example 1C; mixed M.P.=261.2°–264.5° C. (corr.). Molecular weight calculated, 336; found 364.

*Example 3*

A. In a dry 100 ml. standard taper flask was placed 6.7 g. (0.02 mole) of the monomeric product of Example 1B, 4.8 g. (0.08 mole) of dry isopropyl alcohol and 50 ml. of dry benzene. The mixture was refluxed on a silicone oil bath for a period of 8 hours at 110° C. Complete solution did not occur. The mixture was cooled to room temperature, the solid filtered, washed with dry n-hexane and dried in a vacuum desiccator. Weight of recovered monomer 1.1 g. The filtrate and washings were combined and the benzene and the n-hexane removed in vacuum. A mixture of crystalline-appearing solid and glass was obtained. It was digested at room temperature with dry n-heptane. The solid was filtered and washed with n-heptane. Weight of solid 2.25 g. Total weight of recovered monomer 3.35 g. The washings and filtrate were combined and the n-heptane removed in vacuum. There was obtained 3.35 g. of a light-colored glass-like low polymeric material (50% conversion). That the product had the same elemental composition as the corresponding monomeric material was shown by its analysis, which gave the following results:

C=57.05%; H=9.46%; Ti=14.45%.

B. In a dry 100 ml. standard taper, round-bottom flask was placed 6.72 g. (0.02 mole) of the monomeric product of Example 1B, 1.5 g. (0.02 mole) of dry (dried over calcium hydride) C.P. n-butyl amine and 50 ml. of dry benzene. The mixture was refluxed on a silicone oil bath at 100°–110° C. for a total time of five hours, nearly all of the solid going into solution during the first thirty minutes. The benzene and n-butyl amine were removed in vacuo, leaving a mixture of solid and glass which was digested at room temperature with dry n-hexane. The mixture was filtered and the solid washed three times with n-hexane, and dried in a vacuum desiccator. Weight of solid 3.35 g. The filtrate and washings were combined and the n-hexane removed, first at atmospheric pressure and finally at 80° and 3 mm. pressure, yielding 3.38 g. of amber-colored glass-like polymeric material (approximately 50% conversion).

*Analysis.*—C=56.88%; H=9.55%; Ti=14.76%.

*Example 4*

In a dry one liter, three-necked, standard taper, round-bottom flask equipped with a mercury seal stirrer and inlet tube for nitrogen and a condenser set for downward distillation were placed 86.8 g. (0.594 mole) of 2-ethyl-hexanediol-1,3 and 300 ml. of dry xylene. To the resulting solution while being stirred were added all at once 84.3 g. (0.297 mole) of tetraisopropyl titanate. The resulting solution was clear. The flask was heated and azeotropic distillation continued until the temperature of the distilling liquid remained constant at 138° C., and the resulting solution was cooled. All attempts to obtain crystals from the resulting solution failed. A very small amount of solid material was removed from the solution by filtering, following which the xylene was removed by vacuum distillation. Weight of orange or amber-colored sticky glass 96 g. (theoretical 99.8 g.). Samples were dried in a drying pistol at 61° C. and 3 mm. pressure.

*Analysis.*—Calculated for $C_{16}H_{32}O_4Ti$: C=57.12%; H=9.58%; Ti=14.24%. Found: C=55.87%, 56.12%; H=9.55%, 9.32%; Ti=14.66%, 14.78%.

Molecular weight found 723 (modified Rast method), calculated for $C_{16}H_{32}O_4Ti$ 336.4, average degree of polymerization 2.15.

Example 5

In a dry 100 ml. standard taper, round-bottom flask was placed 28.4 g. (0.1 mole) of pure tetraisopropyl titanate (B.P. 90°–91° C./3 mm. pressure) and 12.4 g. (0.2 mole) of pure ethylene glycol. An immediate solid precipitate was formed with the evolution of heat. The contents of the flask were well mixed by swirling and the isopropyl alcohol distilled off at reduced pressure at a temperature of 55°–35° C. The resulting nearly white solid was dried in a vacuum desiccator overnight. Weight of solid 17.1 g. (theoretical 16.8 g.). The weight of isopropyl alcohol removed was 23.7 g. (theoretical 24.0 g.). The solid was digested in dry benzene for about three hours at 16° C., and the mixture was cooled to room temperature and the solid filtered and washed several times with dry benzene and the resulting white solid dried in a vacuum desiccator. Weight of white solid 16.9 g. (theoretical 16.8 g.). Samples for analysis were dried in drying pistols at 61° C. at 1 mm. pressure. The product was insoluble in all organic solvents tested—benzene, acetone, pyridine, and chloroform—and did not melt below 300°, but decomposed slowly upon heating.

*Analysis.*—Calculated for $C_4H_8O_4Ti$: C=28.60%; H=4.80%; Ti=28.51%. Found: C=28.67%, 28.49%; H=4.88%, 4.99%; Ti=28.16%, 28.42%.

Example 6

In a dry 250 ml. Erlenmeyer flask was dissolved 28.4 g. of distilled tetraisopropyl titanate in 55 g. of dry benzene. To the resulting clear, colorless solution was added all at once 12.4 g. of pure ethylene glycol. No precipitate was immediately formed, but heat was evolved, and after about five minutes the clear solution became cloudy. The cloudiness kept increasing with time and a white solid kept separating out. The flask was allowed to stand for 72 hours at room temperature. The resulting white crystalline-looking solid was separated by filtering, washed several times with dry benzene and dried in a vacuum desiccator. Weight of solid material 6.9 g.

The remaining liquid reaction mixture was combined with the benzene washing solvent, and the isopropyl alcohol and benzene were distilled in vacuo at 45°–35° C., leaving a residue of solid material which after drying weighed 9.9 g. Total weight of solid material 16.8 g. (theoretical 16.8 g.). The product was insoluble in the same solvents tested in Example 5 and did not melt below 300°, but decomposed slowly upon heating.

*Analysis.*—Calculated for $C_4H_8O_4Ti$: C=28.60%; H=4.80%; Ti=28.51%. Found: C=28.84%, 28.63%; H=5.02%, 4.85%; Ti=28.51%, 28.36%.

Example 7

In a dry 250 ml. standard taper, round-bottom flask was placed 32.0 g. (0.2 mole) of pure trimethylene diacetate. To the trimethylene diacetate, 28.4 g. (0.6 mole) of pure tetraisopropyl titanate was added all at once, and the mixture was well mixed by swirling. No heat was evolved immediately; however, heat was evolved about five minutes after mixing. The flask was allowed to stand at room temperature for 2½ hours, during which time no solid separated. It was then refluxed for 20 minutes, resulting in the formation of a large amount of solid. The flask was cooled in an ice bath, the white solid was filtered, washed with isopropyl acetate and dried in a vacuum desiccator. Weight of white crystalline-looking solid 15.7 g. (theoretical 19.6 g.). The remaining liquid reaction mixture was combined with the isopropyl acetate washing solvent and the isopropyl acetate distilled off in vacuo at 70°–50° C. The residue was a light yellow colored solid. The solid was washed several times with isopropyl acetate and dried in a vacuum desiccator. Weight of white crystalline solid 3.7 g., total yield 19.4 g. (theoretical 19.6 g.). The material did not melt below 300° C., but is decomposed slowly upon heating; it was insoluble in all of the solvents tested in Example 5.

*Analysis.*—Calculated for $C_6H_{12}O_4Ti$: C=36.75%; H=6.17%; Ti=24.43%. Found: C=37.25%; H=6.17%; Ti=24.58%.

Example 8

In a dry 250 ml. standard taper, round-bottom flask 18.4 g. (0.2 mole) of pure glycerol was dissolved in 42.9 g. of dry isopropyl alcohol. To the resulting solution was added 28.4 g. (0.1 mole) of tetraisopropyl titanate, and there was an immediate solid precipitate formed. The mixture was well mixed by swirling and the isopropyl alcohol distilled in vacuo at 45°–30° C. The product was then dried in a vacuum desiccator to give a white crystalline-appearing solid weighing 24.3 g. (theoretical 22.8 g.). The total weight of isopropyl alcohol removed was 65.3 g. (theoretical 66.9 g.). The product was practically insoluble in all of the organic solvents tested in Example 5 and did not melt below 300° C. Samples of the product for analysis were dried in drying pistols at 100° C. and 3 mm. pressure to constant weight.

*Analysis.*—Calculated for $C_6H_{12}O_6Ti$: C=31.60%; H=5.26%; Ti=21.00%. Found: C=31.42%; H=5.30%; Ti=21.44%.

Example 9

In a dry 250 ml. standard taper, round-bottom flask was placed 18.0 g. (0.2 mole) of pure redistilled optically inactive butanediol-2,3. To the diol was added all at once 28.4 g. (0.1 mole) of pure tetraisopropyl titanate. The reaction was exothermic, but no solid precipitated out. The isopropyl alcohol was removed by distillation in vacuo at 50°–30° C., during which time a solid kept separating out. The product was dried in a vacuum desiccator; weight 23.0 g. (theoretical 22.4 g.). The total weight of isopropyl alcohol removed was 23.3 g. (theoretical 24.0 g.). The product was soluble in benzene and chloroform, but isoluble in n-hexane. The material did not melt below 300° C., but decomposed slowly upon heating.

*Analysis.*—Calculated for $C_8H_{16}O_4Ti$: C=42.87%; H=7.20%; Ti=21.37%. Found: C=42.65%, 42.80%; H=6.92%, 7.08%; Ti=21.38%, 21.62%.

Example 10

In a dry 250 ml. standard taper, round-bottom flask 18.0 g. (0.2 mole) of pure redistilled optically inactive butanediol-2,3 was dissolved in 35.7 g. of dry isopropyl alcohol. To the resulting solution was added all at once 28.4 g. (0.1 mole) of pure tetraisopropyl titanate. The mixture was well mixed by swirling. Heat was evolved, but no solid precipitated even after five minutes. The flask was then connected to a distillation apparatus and the isopropyl alcohol distilled at 55°–35° C., leaving a solid residue. The total weight of isopropyl alcohol removed was 58.5 g. (theoretical 59.7 g.). The product after drying weighed 23.5 g. (theoretical 22.4 g.). The product did not melt below 310° C., but decomposed slowly upon heating. The product was soluble at room temperature in benzene, chloroform and carbon tetrachloride, and slightly soluble in p-dioxane, the solution turning yellow. It was insoluble in n-heptane, petroleum ether B.P. 35°–60° C.), actone and isopropyl acetate.

Five grams of the above product were mixed with 40 ml. of dry benzene at room temperature. The mixture was filtered and the insoluble material washed and dried. Weight of insoluble solid was 0.2 g. The benzene from the filtered washings was removed in vacuo at 30° C., leaving a solid glass residue weighting 4.8 g. To the resulting solid all at once was added 40 ml. of dry n-hexane, and the mixture was digested at 30° C. for one hour. It was cooled in an ice bath the crystalline-looking solid was filtered, washed with n-hexane and dried. The weight of clear white solid was 1.8 g. The normal hexane from the filterings and washings was removed in vacuo at 35°–40° C. A solid glass was obtained as a residue, weighing 3.0 g. This glass is very soluble in ethyl ether while the crystalline white solid is not soluble. Samples of the crystalline-looking solid and solid glass were dried in a drying pistol at 100° C. and 3 mm. pressure to constant weight.

*Analysis.*—Calculated for $C_8H_{16}O_4Ti$: C=42.8%; H=7.20%; Ti=21.37%. Found—for crystalline solid: C=43.04%; H=7.45%; Ti=21.24%. Found—for solid glass: C=43.11%; H=7.36%; Ti=21.04%.

The molecular weight of the crystalline-appearing solid, as determined by a modified Rast method, was 223.5. Calculated for monomeric material: 224.1.

When the same reaction was carried out in the absence of excess isopropyl alcohol or other solvent, the product obtained was nearly all in the form of the crystalline white solid.

Example 11

In a dry 250 ml. standard taper, round-bottom flask was placed 23.6 g. (0.2 mole) of pure 2-methyl-pentanediol-2,4. To the diol was added all at once 28.4 g. (0.1 mole) of pure tetraisopropyl titanate. The mixture was well mixed by swirling. Heat was evolved, but no solid precipitate appeared. The flask was then connected to an apparatus set for distillation and the isopropyl alcohol distilled off in vacuo at 50°–30° C., leaving a solid glassy residue which after drying weighed 28.3 g. (theoretical 28.0 g.). The total weight of isopropyl alcohol removed was 23.6 g. (theoretical 24.0 g.). The product was soluble in benzene, n-hexane, chloroform and ethyl ether. Samples for analysis of this material were dried in drying pistols at 61° C. and 3 mm. pressure.

*Analysis.*—Calculated for $C_{12}H_{24}O_4Ti$: C=51.43%; H=8.63%; Ti=17.09%. Found: C=50.80%, 50.98%; H=8.35%, 8.14%; Ti=16.54%, 16.78%.

Calculated molecular weight for $C_{12}H_{24}O_4Ti$, 280.2. Found, 284.3.

Example 12

In a dry 500 ml. standard taper, round-bottom flask was placed 21.0 g. (0.2 mole) of recrystallized 2-amino-2-methyl-propanediol-1,2 (M.P. 109°–110.5° C. corr.) and 61.3 g. of dry isopropyl alcohol. The mixture was warmed until solution occurred. To the resulting solution was added all at once 28.4 g. (0.1 mole) of pure tetraisopropyl titanate. The mixture was well mixed by swirling. The resulting solution was clear. The flask was then connected to a distillation apparatus and the isopropyl alcohol distilled in vacuo at a temperature of 55°–30° C., leaving a white glassy solid which after vacuum drying weighed 28.0 g. (theoretical 25.4 g.). The total weight of isopropyl alcohol removed was 82.6 g. (theoretical 85.3 g.). The product was very soluble in water at room temperature, but insoluble in all of the organic solvents tested in Example 5. It was slightly soluble in cold but soluble in hot dimethyl formamide. Samples of the solid gas were dried in a drying pistol to constant weight at 61° C. and 3 mm. pressure.

*Analysis.*—Calculated for $C_8H_{18}O_4N_2Ti$: C=37.80%; H=7.14%; N=11.02%; Ti=18.84%. Found: C=38.24%; H=7.52%; N=10.56%; Ti=18.44%.

Example 13

In a dry 250 ml. Erlenmeyer flask was dissolved 20.8 g. (0.2 mole) of malonic acid in 111 g. of dry isopropyl acetate. Heating was necessary to cause solution. To the hot solution was added all at once 28.4 g. (0.1 mole) of tetraisopropyl titanate. An immediate precipitation occurred. The mixture was well mixed by swirling. The flask was cooled in an ice bath and the resulting solid was filtered, washed with isopropyl acetate and dried in a vacuum desiccator, the weight of tan-colored solid being 24.9 g. (theoretical 25.2 g.). The product did not melt below 300° C.; however, it decomposed upon heating. It was insoluble in chloroform, n-heptane, benzene and acetone, but soluble at room temperature in dimethyl formamide. Samples of the above solid were dried in a drying pistol at 61° C. and 3 mm. pressure.

*Analysis.*—Calculated for $C_6H_4O_8Ti$: C=28.60%; H=1.60%; Ti=19.00%. Found: C=28.92%; H=1.84%; Ti=19.25%.

Example 14

In a dry 250 ml. standard taper, round-bottom flask was placed 32.0 g. (0.2 mole) of 2-butyl-2-ethyl-1,3-propanediol. To the diol was added, all at once, 28.4 g. (0.1 mole) of pure tetraisopropyl titanate. The mixture was stirred by swirling until all the solid diol dissolved. Heat was evolved. The flask was connected to a distillation apparatus, heated at 100°–80° C. and the isopropyl alcohol distilled in vacuo at 65°–30° C. During the distillation solid kept separating out. The weight of solid white product after drying in a vacuum desiccator was 37.2 g. (theoretical 36.4 g.), M.P. 273.8°–276.0° C. (corr.); melting point tube placed in the heating bath at 245° C. The total weight of alcohol removed was 23.0 g. (theoretical 24.0 g.). A sample of the above product was dried in a drying pistol until no loss in weight occurred.

*Analysis.*—Calculated for $C_{18}H_{36}O_4Ti$: C=59.33%; H=9.96%; Ti=13.14%. Found: C=58.71%, 59.04%; H=9.97%, 9.73%; Ti=13.10%, 12.88%.

Example 15

Into a round-bottom flask was placed 58.5 g. (0.4 mole) of ethylene diacetate and 56.8 g. (0.2 mole) of distilled tetraisopropyl titanate. Initial mixing of the two reactants resulted in a lowering of the temperature of the mixture, but this was subsequently followed by an evolution of heat. The flask was heated in a silicone oil bath at 85°–100° C.; precipitation of solid occurred 20 minutes after heating started. The isopropyl acetate was distilled in vacuum. The weight of white solid product after drying in a vacuum desiccator was 35.6 g. (theoretical 34.1 g.).

*Analysis.*—Calculated for $C_4H_8O_4Ti$: C=28.60%; H=4.80%; Ti=28.51%. Found: C=28.49%; H=4.65%; Ti=28.16%.

Example 16

In a dry 500 ml. standard taper flask containing 85.8 g. warm dry isopropyl alcohol was dissolved 27.6 g. (0.2 mole) of phenyl-1,2-ethanediol recrystallized from isopropyl alcohol in the form of long needles, M.P. 64.5°–65.5° C. To the resulting solution was added all at once 28.4 g. (0.1 mole) of dissolved distilled tetraisopropyl titanate. The mixture was well mixed by swirling and an immediate precipitate was obtained. The flask was connected to a distillation apparatus, heated at 110°–80° C. and the isopropyl alcohol distilled in vacuo at 80°–35° C. The flask containing the solid product was then heated for three hours at 80° C. and 3 mm. pressure, the weight of nearly white solid product remaining being 32.3 g. (theoretical 32.0 g.); M.P. 261.0°–262.0° C. (corr., dec.). The product was insoluble in hot benzene, xylene, chloroform, ethyl acetate, but soluble in hot dimethyl formamide. A sample of the above product was dried in a drying pistol at 78° C. and 3 mm. pressure to constant weight.

*Analysis.*—Calculated for $C_{16}H_{16}O_4Ti$: C=60.01%; H=5.04%; Ti=14.96%. Found: C=59.99%; H=5.02%; Ti=15.18%.

Molecular weight calculated for $C_{16}H_{16}O_4Ti$, 320.2. Found, 321.8.

Example 17

In a dry 500 ml. round-bottom flask there was dissolved 25.2 g. (0.2 mole) of C.P. anhydrous oxalic acid in 96.4 g. of dry isopropyl alcohol. To the resulting solution was added all at once 28.4 g. (0.1 mole) of distilled tetraisopropyl titanate. The mixture was well mixed by swirling. The flask was heated under reflux for one hour, cooled and for convenience of manipulation the solid which separated immediately was filtered off and dried. Weight of this solid 24.4 g. More such product was obtained by distillation of the solvent from the above filtrate. This amounted to 4.8 g.; total yield 29.2 g. (theoretical 29.6 g.). The product was very soluble in water. A sample of the above combined product was dried in a drying pistol at 78° C. and 3 mm. pressure to constant weight.

*Analysis.*—Calculated for $C_4O_8Ti$: C=21.45%; H=0.00%; Ti=21.39%. Found: C=21.74%; H=0.00%; Ti=21.62%.

Example 18

In a dry 250 ml. standard taper, round-bottom flask was placed a solution of 11.8 g. (0.1 mole) of pure anhydrous pinacol (B.P. 171°–172° C.) in 33.0 g. of dry isopropyl alcohol. To the resulting solution was added all at once 14.2 g. (0.05 mole) of pure tetraisopropyl titanate. The mixture was well mixed by swirling. No precipitate was formed and the solution became warm. The flask was connected to a distillation apparatus, heated in a silicone oil bath at a temperature of 110°–90° C. and the isopropyl alcohol distilled in vacuo at a temperature of 65°–35° C. The flask was heated at 95° C. and 3 mm. pressure for about one hour. Weight of light-colored solid glass 14.9 g. (theoretical 14.0 g.). A sample of the above product was dried in a drying pistol at 78° C. and 3 mm. pressure to constant weight.

*Analysis.*—Calculated for $C_{12}H_{24}O_4Ti$: C=51.43%; H=8.63%; Ti=17.10%. Found: C=50.82%; H=8.91%; Ti=16.67%.

Example 19

In a dry 500 ml. standard taper, round-bottom flask was placed a solution of 26.8 g. (0.2) mole) of 1, 2, 6-hexanetriol in 77.0 g. of dry isopropyl alcohol. To the resulting solution was added all at once 28.4 g. (0.1 mole) of pure tetraisopropyl titanate. An immediate precipitate occurred which did not go into solution. The flask was connected to a distillation apparatus, heated in a silicone oil bath at 100° C. until a clear solution was obtained. Vacuum was applied and the isopropyl alcohol distilled at a temperature of 75°–30° C. The reaction flask was then heated at 80° C. and 3 mm. pressure for one hour. The total weight of isopropyl alcohol removed was 100.5 g. (theoretical 101.0 g.), while the weight of amber-colored glass product was 31.7 g. (theoretical 31.2 g.). The product was insoluble in hot benzene, xylene, chloroform, water, and dimethyl formamide. A sample of the above product was dried in a drying pistol at 78° C. and 3 mm pressure.

*Analysis.*—Calculated for $C_{12}H_{24}O_6Ti$: C=46.20%; H = 7.74%; Ti = 15.34%. Found: C = 45.88%; H=8.57%; Ti=15.01%.

Example 20

In a dry 125 ml. Erlenmeyer flask was placed 22.1 g. (0.2 mole) of 3-chloro-1,2-propanediol. To the diol was added all at once 28.4 g. (0.1 mole) of pure tetraisopropyl titanate. An immediate precipitate occurred with the evolution of heat. The flask was well mixed by swirling and heated for a few minutes at 100° C. The flask was cooled in an ice bath, diluted with 50 ml. of dry isopropyl acetate and the solid filtered and washed with dry isopropyl acetate. The solid was dried in a vacuum desiccator. The weight of the white crystalline-looking solid was 12.8 g., M.P. greater than 260° C. (dec.). The filtrate and washings were combined and the isopropyl alcohol and the isopropyl acetate removed in vacuum at a temperature of 50°–30° C. The flask was then heated at 80° C. and 3 mm. pressure and dried in a vacuum desiccator. Weight 14.8 g., total yield 27.6 g. (theoretical 26.6 g.). Samples of the above two products were dried to constant weight at 78° C. and 3 mm. pressure.

*Analysis.*—Calculated for $C_6H_{10}O_4Cl_2Ti$: C=27.20%; H=3.80%; Cl=26.75%; Ti=18.07%. Found—for crystalline solid: C=27.22%; H=4.06%; Cl=26.96%; Ti=18.66%. Found—for glass: C=27.50%; H=4.35%; Cl=27.08%; Ti=18.29%.

Example 21

In a dry 500 ml. standard taper, round-bottom flask was placed 29.8 g. (0.2 mole) of 2-ethyl-2-nitro-1,3-propanediol (M.P. 56°–57° C.) and 68.6 g. of dry isopropyl alcohol. To the resulting solution (slight warming was necessary) was added all at once 28.4 g. (0.1 mole) of pure tetraisopropyl titanate. The contents were well mixed by swirling and an immediate precipitate occurred with the evolution of heat. The flask was connected to a distillation apparatus, heated at 110°–90° C. and the isopropyl alcohol distilled in vacuo at 80°–30° C. The reaction flask was then heated at 80° and 10 mm. pressure for 30 minutes. The weight of isopropyl alcohol was 89.0 g. (theoretical 92.8 g.). Weight of white crystalline-looking solid 38.0 g. (theoretical 34.2 g.). A sample of the above product was dried to constant weight at 100° C. and 3 mm. pressure.

*Analysis.*—Calculated for $C_{10}H_{18}O_8N_2Ti$: C=35.10%; H=5.30%; N=8.19%; Ti=14.00%. Found: C=34.90%; H=5.44%; N=8.14%; Ti=14.12%.

Example 22

In a dry 250 ml. standard taper, round-bottom flask was placed 14.6 g. (0.1 mole) of octylene glycol (2-ethyl-1,3-hexanediol). To the diol was added all at once 28.4 g. (0.1 mole) of pure tetraisopropyl titanate. The mixture was well mixed by swirling and then allowed to cool to room temperature. To the resulting clear solution was added all at once a solution of 9.0 g. (0.1 mole) of C.P. anhydrous oxalic acid in 54.2 g. (including washing) of dry isopropyl alcohol. The mixture was swirled and a viscous liquid separated out. The flask was connected to a distillation apparatus heated at 80°–90° C. and the isopropyl alcohol distilled in vacuum at a temperature of 80°–30° C. The mixture was viscous and became homogeneous on heating. No solid precipitated out during the distillation. Weight of isopropyl alcohol 75.4 g. (theoretical 78.2 g.). Weight of amber-colored solid glass 30.8 g. (theoretical 28.0 g.). The above product is insoluble in xylene and water. It is soluble in boiling chloroform, pyridine and dimethyl formamide. A sample of the above product was dried to constant weight at 100° C. and 3 mm. pressure in a drying pistol.

*Analysis.*—Calculated for $C_{10}H_{16}O_6Ti$: C=42.87%; H=5.75%; Ti=17.10%. Found: C=43.14%; H=5.94%; Ti=17.18%.

Although specific embodiments of the invention have been herein described, it is not intended to limit the invention solely thereto, but to include all of the obvious variations and modifications within the spirit and scope of the appended claims.

I claim:

1. An organo-metallic cyclic titanium compound containing at least two heterocyclic rings and having from one to five titanium atoms in the molecule, each titanium atom forming a part of two adjacent rings, each ring consisting, in addition to titanium, of —O—R—O— groups in which each oxygen atom is bonded directly to titanium by a primary valence bond and R is a group containing only from two to three aliphatic carbon atoms in the chain connecting the oxygen atoms, the number of

—O—R—O— groups in the molecule being twice the number of titanium atoms.

2. A monomeric cyclic organo-metallic titanium compound having two rings joined by a titanium atom common to both rings, each ring containing from five to six atoms of which the two adjacent to the titanium are oxygen atoms bonded by primary valence bonds to the titanium and all the remaining atoms of the ring are aliphatic carbon atoms.

3. An addition homopolymer of the monomeric compound defined in claim 2, the average degree of polymerization of said polymer being no greater than five.

4. A monomeric organo-metallic cyclic titanium ester of a polyhydroxy aliphatic alcohol, said ester having two rings joined by a titanium atom common to both rings, each ring containing from five to six atoms of which the two adjacent to the titanium are oxygen atoms bonded by primary valence bonds to the titanium and all the remaining atoms of the ring are aliphatic carbon atoms.

5. An addition homopolymer of the monomeric compound defined in claim 4, the average degree of polymerization of said polymer being no greater than five.

6. An organo-metallic cyclic titanium mixed anhydride of an aliphatic dicarboxylic acid, which acid contains only from two to three carbon atoms in the chain linking the acidic hydroxyl groups, said anhydride having at least two heterocyclic rings and having from one to five titanium atoms in the molecule, each titanium atom forming a part of two adjacent rings, each ring consisting, in addition to titanium, of dicarboxylic acid residues having the structure —O—R—O— in which each oxygen atom is bonded directly to titanium by a primary valence bond and R is a group containing only from two to three aliphatic carbon atoms in the chain connecting the oxygen atoms, the number of dicarboxylic acid residues in the molecule being twice the number of titanium atoms.

7. A monomeric organo-metallic cyclic titanium ester of 2-ethylhexanediol-1,3 in which a single titanium atom replaces all of the hydroxyl hydrogen atoms of two molecules of said diol.

8. An addition homopolymer of the compound defined in claim 7 in which the average degree of polymerization is no greater than five.

9. An addition homopolymer as defined in claim 8 in which the degree of polymerization is two.

10. An organo-metallic cyclic titanium ester of 2-amino-2-methylpropanediol-1,3, said ester containing at least two heterocyclic rings and having from one to five titanium atoms in the molecule, each titanium atom forming a part of two adjacent rings, each ring consisting, in addition to titanium, of diol residues having the structure

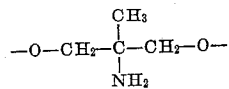

in which each oxygen atom is bonded directly to titanium by a primary valence bond, the number of said residues in the molecule being twice the number of titanium atoms.

11. An organo-metallic cyclic titanium ester of optically inactive butanediol-2,3, said ester containing at least two heterocyclic rings and having from one to five titanium atoms in the molecule, each titanium atom forming a part of two adjacent rings, each ring consisting, in addition to titanium, of diol residues having the structure

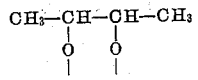

in which each oxygen atom is bonded directly to titanium by a primary valence bond, the number of said residues in the molecule being twice the number of titanium atoms.

12. An organo-metallic cyclic titanium mixed anhydride of oxalic acid, said anhydride having at least two heterocyclic rings and having from one to five titanium atoms in the molecule, each titanium atom forming a part of two adjacent rings, each ring consisting in addition to titanium of oxalic acid residues having the structure

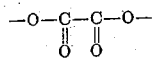

in which each oxygen atom having a free valence is bonded directly to titanium, the number of said residues in the molecule being twice the number of titanium atoms.

13. The method of making cyclic organo-metallic titanium compounds which comprises reacting under anhydrous conditions a lower tetraalkyl titanate with two molecular proportions of an organic compound containing only two reactive groups connected to an aliphatic carbon chain in which said groups are spaced apart by two to three chain carbon atoms, the carbon atoms of said chain being bonded directly to each other, said reactive groups being selected from the class consisting of hydroxy groups and esters of such groups with lower aliphatic carboxylic acids, and separating from the reaction mixture substantially four molecular proportions of a by-product selected from the class consisting of alkanol and an alkyl ester of said carboxylic acid.

14. The method of making cyclic organo-metallic titanium esters which comprises reacting under anhydrous conditions a lower tetraalkyl titanate with two molecular proportions of a polyhydric aliphatic alcohol containing only two hydroxyl groups connected by a chain of two to three carbon atoms, and separating from the reaction mixture substantially four molecular proportions of by-product alkanol.

15. The method of making cyclic organo-metallic titanium esters which comprises reacting under anhydrous conditions a lower tetraalkyl titanate with two molecular proportions of a lower fatty acid ester of a polyhydric aliphatic alcohol containing only two hydroxyl groups connected by a chain of two to three carbon atoms, and separating from the reaction mixture substantially four molecular proportions of by-product alkyl ester of said fatty acid.

16. The method of making cyclic organo-metallic titanium mixed anhydrides which comprises reacting under anhydrous conditions a lower tetraalkyl titanate with two molecular proportions of an aliphatic polycarboxylic organic acid containing only two acidic hydroxyl groups connected by a chain of two to three carbon atoms, and separating from the reaction mixture substantially four molecular proportions of by-product alkanol.

17. The method of making an organo-metallic cyclic titanium compound as defined in claim 1 which comprises reacting under anhydrous conditions a lower tetraalkyl titanate with two molecular proportions of a compound containing only two reactive groups connected to an aliphatic carbon chain in which said groups are spaced apart by two to three chain carbon atoms, the carbon atoms of said chain being bonded directly to each other, said reactive groups being selected from the class consisting of hydroxy groups and esters of such groups with lower aliphatic carboxylic acids, and separating said organo-metallic cyclic titanium compound from the reaction mixture containing substantially four molecular proportions of by-product alkanol.

18. The method of making cyclic organo-metallic titanium compounds which comprises reacting under anhydrous conditions a lower tetraalkyl titanate with two molecular proportions of a compound containing only two reactive groups connected to an aliphatic carbon chain in which said groups are spaced apart by two to three chain carbon atoms, the carbon atoms of said chain being bonded directly to each other, said reactive groups being selected from the class consisting of hydroxy groups and esters of such groups with lower aliphatic carboxylic acids, and separating from the reaction mixture by distillation substantially four molecular proportions of a by-product selected from the class consisting of alkanol and an alkyl ester of said carboxylic acid.

19. The method defined in claim 18 in which the reactants are reacted in the presence of a volatile solvent inert to the reactants and said solvent is separated from the reaction mixture by distillation.

20. The method defined in claim 18 in which the reactants are reacted in the presence of a lower aliphatic monohydric alcohol more volatile than said compound containing two reactive groups, and said alcohol is separated from the reaction mixture by distillation.

21. The method of polymerizing a monomeric organo-metallic cyclic titanium compound as defined in claim 2 which comprises heating said ester in an inert solvent containing a chelating agent.

22. The method of depolymerizing a polymeric organo-metallic cyclic titanium compound as defined in claim 3 which comprises dissolving said polymer in a lower alkyl alcohol containing up to four carbon atoms, heating the solution, and removing said alcohol by distillation.

23. The method of polymerizing the monomeric organo-metallic cyclic titanium ester defined in claim 7 which comprises heating said ester in an inert solvent containing a chelating agent.

24. The method of depolymerizing the addition polymer defined in claim 8 which comprises dissolving said polymer in a lower alkyl alcohol containing up to four carbon atoms heating the solution, and removing said alcohol by distillation.

25. The method of making a cyclic organo-metallic titanium ester of 2-ethylhexanediol-1,3 which comprises mixing under anhydrous conditions a lower tetraalkyl titanate with two molecular proportions of said diol, and separating from the reaction mixture substantially four molecular proportions of by-product alkanol.

26. The method of making a cyclic organo-metallic titanium ester of 2-amino-2-methylpropanediol-1,3 which comprises mixing under anhydrous conditions a lower tetraalkyl titanate with two molecular proportions of said diol, and separating from the reaction mixture substantially four molecular proportions of by-product alkanol.

27. The method of making a cyclic organo-metallic titanium ester of optically inactive butanediol-2,3 which comprises mixing under anhydrous conditions a lower tetraalkyl titanate with two molecular proportions of said diol, and separating from the reaction mixture substantially four molecular proportions of by-product alkanol.

28. The method of making a cyclic organo-metallic titanium mixed anhydride of oxalic acid which comprises mixing under anhydrous conditions a tetraalkyl titanate with two molecular proportions of said acid, and separating from the reaction mixture substantially four molecular proportions of by-product alkanol.

References Cited in the file of this patent

UNITED STATES PATENTS

| | | |
|---|---|---|
| 1,059,740 | Liebknecht et al. | Apr. 22, 1913 |
| 2,643,252 | Bostwick | June 23, 1953 |
| 2,666,772 | Boyd | Jan. 19, 1954 |
| 2,795,553 | Lowe | June 11, 1957 |

OTHER REFERENCES

Mattock: "J.C.S." (London), March 1954, pp. 989–997.

UNITED STATES PATENT OFFICE
CERTIFICATE OF CORRECTION

Patent No. 2,920,089 January 5, 1960

Carlos M. Samour

It is hereby certified that error appears in the printed specification of the above numbered patent requiring correction and that the said Letters Patent should read as corrected below.

Column 1, line 19, for "hetrocyclic" read -- heterocyclic --; line 38, for "polyhdric" read -- polyhydric --; column 3, line 45, for "tera" read -- tetra --; line 53, for "recation" read -- reaction --; column 7, line 60, for "4.85%" read -- 4.86% --; column 8, line 9, for "is" read -- it --; line 72, for "B.P." read -- (B.P. --; same line, for "actone" read -- acetone --; column 9, line 16, for "C═42.8%" read -- C═42.87% --; line 66, for "gas" read -- glass --; column 16, line 2, after "atoms" insert a comma; line 34, list of references cited, under the heading UNITED STATES PATENTS, for the patent number "2,643,252" read -- 2,643,262 --.

Signed and sealed this 14th day of June 1960.

(SEAL)
Attest:

KARL H. AXLINE
Attesting Officer

ROBERT C. WATSON
Commissioner of Patents